(12) United States Patent
Huang et al.

(10) Patent No.: US 9,252,680 B2
(45) Date of Patent: Feb. 2, 2016

(54) SOLAR POWER SYSTEM AND COMMUNICATION APPARATUS

(71) Applicant: AU Optronics Corporation, Hsin-Chu (TW)

(72) Inventors: Yi-Ming Huang, Hsin-Chu (TW); Min-Chien Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 513 days.

(21) Appl. No.: 13/726,855

(22) Filed: Dec. 26, 2012

(65) Prior Publication Data

US 2014/0021792 A1    Jan. 23, 2014

(30) Foreign Application Priority Data

Jul. 17, 2012    (CN) .......................... 2012 1 0247757

(51) Int. Cl.
*H02J 1/00* (2006.01)
*H02M 7/44* (2006.01)
*H02J 3/38* (2006.01)

(52) U.S. Cl.
CPC ................. *H02M 7/44* (2013.01); *H02J 3/383* (2013.01); *H02J 2003/388* (2013.01); *Y02B 10/14* (2013.01); *Y02E 10/563* (2013.01); *Y10T 307/707* (2015.04)

(58) Field of Classification Search
USPC ............................................. 307/64, 72, 82
See application file for complete search history.

(56) References Cited

U.S. PATENT DOCUMENTS

| | | | |
|---|---|---|---|
| 8,049,523 B2 | 11/2011 | Gazit | |
| 8,289,742 B2 | 10/2012 | Adest et al. | |
| 2002/0044473 A1 | 4/2002 | Toyomura et al. | |
| 2009/0140715 A1 | 6/2009 | Adest et al. | |
| 2009/0145480 A1 | 6/2009 | Adest et al. | |
| 2011/0121779 A1 | 5/2011 | Ichikawa et al. | |
| 2011/0140520 A1* | 6/2011 | Lee ................................ | 307/25 |
| 2012/0007613 A1 | 1/2012 | Gazit | |
| 2012/0319490 A1 | 12/2012 | Adest et al. | |
| 2013/0147274 A1* | 6/2013 | Ku et al. ......................... | 307/31 |

FOREIGN PATENT DOCUMENTS

| | | |
|---|---|---|
| CN | 101933209 A | 12/2010 |
| TW | 201017893 | 5/2010 |

OTHER PUBLICATIONS

"Sunsine AC Module", Feb. 6, 2010, "http://blog.apao.idv.tw/read.php/388.htm".
"The pertinent parts", "http://tinyurl.com/bvkxwjz".
Morningstar Corporation, "Suresine Pure Sine Wave Inverter", Nov. 6, "http://www.hengs.com/pdf/SI_DataSheet%5B1%5D.pdf", PA, USA.

* cited by examiner

*Primary Examiner* — Danny Nguyen
(74) *Attorney, Agent, or Firm* — WPAT, PC; Justin King

(57) ABSTRACT

A solar power system includes at least one alternating-current module and a communication apparatus. Each alternating-current module includes a solar panel and an alternating-current inverter. The communication apparatus connects to the alternating-current module and controls stand-alone power-generating operations on the alternating-current module. The communication includes a module connector and a control circuit. The module connector is configured for connecting with the alternating-current module. The alternating-current module can be parallel-connected on a household power grid selectively. The communication apparatus can transmit a stand-alone power-generating command to the alternating-current module. The alternating-current inverter may cancel an anti-islanding protection procedure thereon according to the stand-alone power-generating command.

13 Claims, 5 Drawing Sheets

SOLAR POWER SYSTEM AND COMMUNICATION APPARATUS

RELATED APPLICATIONS

This application claims priority to Chinese Patent Application Serial Number 201210247757.1, filed Jul. 17, 2012, which is herein incorporated by reference.

BACKGROUND

1. Technical Field

The present disclosure relates to a solar power system. More to particularly, the present disclosure relates to a solar power system capable of operating independently outside an electricity grid and a communication apparatus of the solar power system.

2. Description of Related Art

Since the oil crisis happened from time to time, people put efforts into searching alternative energy sources, in order to find out sustainable and low-pollution renewable energy sources. Common renewable energy sources include solar power, biomass (bio-fuels), geothermal, wind power, tides, ocean temperature difference power generation . . . , and so on. However, people still hope for finding out a renewable energy source. Among them, utilizing the solar power to generate electricity is regarded as one of the widely discussed renewable energy implementations.

Currently, the traditional fixed solar power system can support three operating modes including On-grid, Off-grid and Hybrid modes. A solar power system may include a plurality of solar power alternating-current (AC) modules. In a traditional solar power system, a large system (such as a fixed solar power generator set within a power plant, or a solar power generator set implemented on a residential roof) is regarded as one basic unit for power generating. With the development of photovoltaic technology, the basic unit for power generating in current system can be changed into a small AC module, which is suitable for household applications in general. However, the smaller AC module in general needs to be operated under the On-grid mode.

In other words, the solar power systems existed in present applications are mainly divided into two groups, which are the fixed system without mobility and the AC module incapable of operating outside the local public electricity grid. Therefore, the solar power equipment with mobility and usability is highly demanded in present applications.

SUMMARY

To solve the problems in the art, the invention provides a solar power system and a communication apparatus thereof. The communication apparatus can be used to control each alternating-current (AC) module in the solar power system, such that the AC module may provide a backup power to all kinds of electronic loads (e.g., mobile phones or other mobile devices) under an Off-grid mode. When the mobility is not required, the AC module can be parallel-connected to the local public electricity grid, such that the AC module may generate electricity like a fixed solar power system. On the other hand, when the mobility is required (e.g., travelling or hanging out for a long time), the AC module with a compact size can be utilized as a mobile power generator, which can be carried by users or mounted on vehicles. The AC module can be used to replace traditional movable power sources, such as batteries or diesel generators.

An aspect of the disclosure is to provide a solar power system, which includes at least one alternating-current module and a communication apparatus. The at least one alternating-current module includes a solar panel and an alternating-current inverter electrically connected with the solar panel. The communication apparatus is connected to the at least one alternating-current module. The communication apparatus is configured for controlling stand-alone power-generating operations on the at least one alternating-current module.

Another aspect of the disclosure is to provide a communication apparatus, which includes a module connector and a control circuit. The module connector is configured for connecting to an alternating-current module. The alternating-current module includes a solar panel and an alternating-current inverter electrically connected to the solar panel. The control circuit is electrically connected to the module connector and configured for controlling operations on the alternating-current inverter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present disclosure. One skilled in the relevant art will recognize, however, that the present disclosure can be practiced without one or more of the specific details, or in combination with or with other components, etc. In other instances, well-known implementations or operations are not shown or described in detail to avoid obscuring aspects of various embodiments of the present disclosure.

Figure 1:
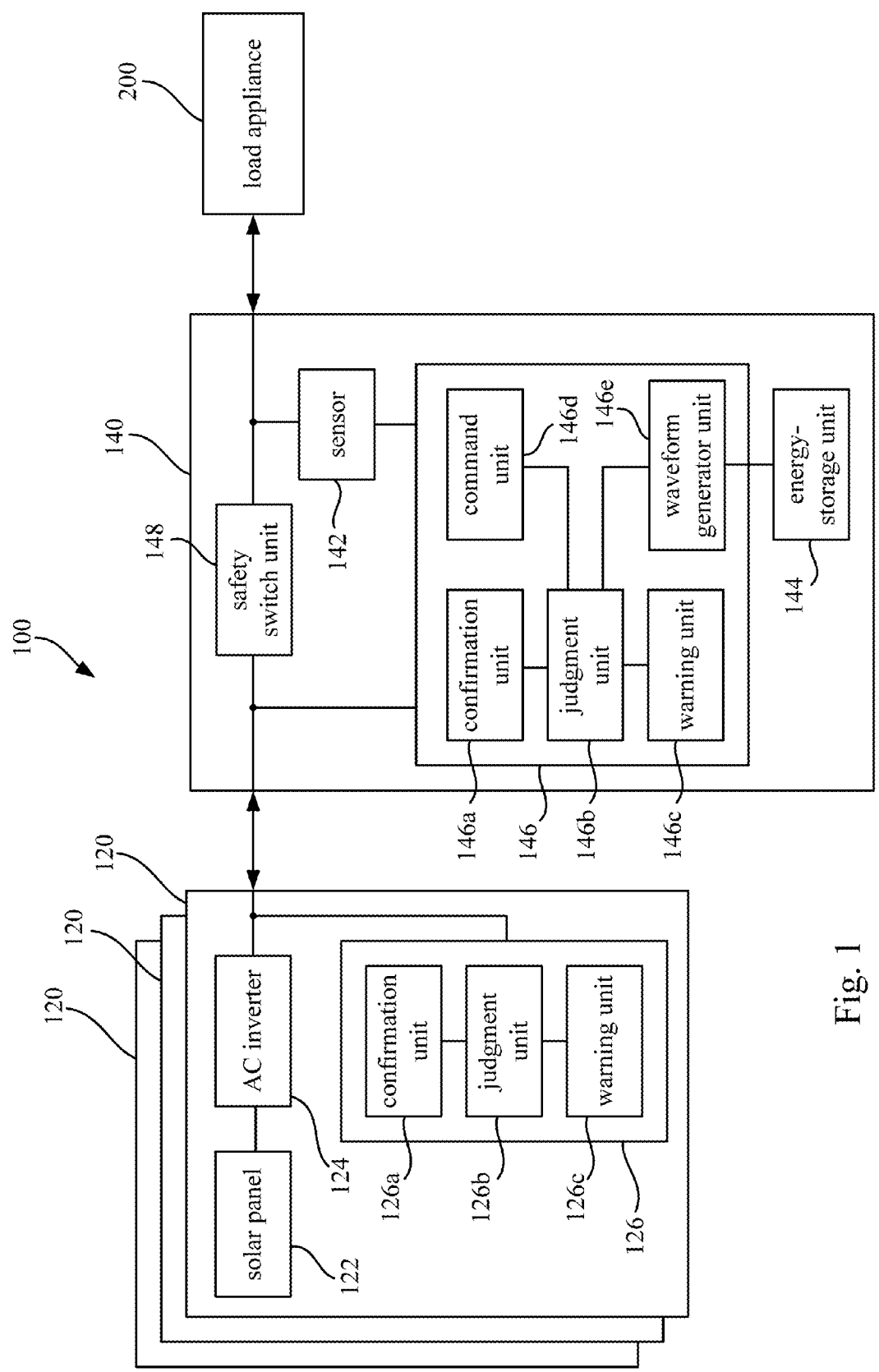
FIG. 1 is function block diagram illustrating a solar power system according to an embodiment of the invention.

The reference is made to FIG. 1, which is function block diagram illustrating a solar power system 100 according to an embodiment of the invention. As shown in FIG. 1, the solar power system 100 includes at least one alternating-current (AC) module 120 and a communication apparatus 140. As the embodiment shown in FIG. 1, the solar power system 100 includes three sets of the AC modules 120 for converting solar power into electrical power, but the invention is not limited to three sets of the AC modules 120. The AC modules 120 can be selectively connected with/without a battery or other energy storages. In the embodiment, the communication apparatus 140 can be coupled to the AC modules 120. The electrical power generated by the AC modules 120 can be provided to a load appliance 200 via the communication apparatus 140.

As shown in FIG. 1, each of the AC modules 120 includes a solar panel 122 and an AC inverter 124. The solar panel 122 and the AC inverter 124 are electrically connected. For convenience of illustration, only one of the AC modules 120 is illustrated with detail function blocks in FIG. 1. In facts, each of the AC modules 120 has corresponding function blocks. The solar panel 122 generates electricity under radiation from the sun. The AC inverter 124 is configured for converting the electrical power generated by the solar panel 122, so as to generate an output power. The communication apparatus 140 is connected to the AC modules 120 and configured for controlling operations on the AC modules 120.

Each of the AC modules 120 is parallel-connected to each other, and can be connected to the communication apparatus 140 via a bus connection. Each of the parallel-connected AC modules 120 has their own AC inverter 124 for generating power independently. Therefore, when one of the AC modules 120 fails, the power-generating function of the solar power system 100 remains, such that the stability of the solar power system 100 is better than multiple solar power generator units connected in series in prior art.

Figure 2:
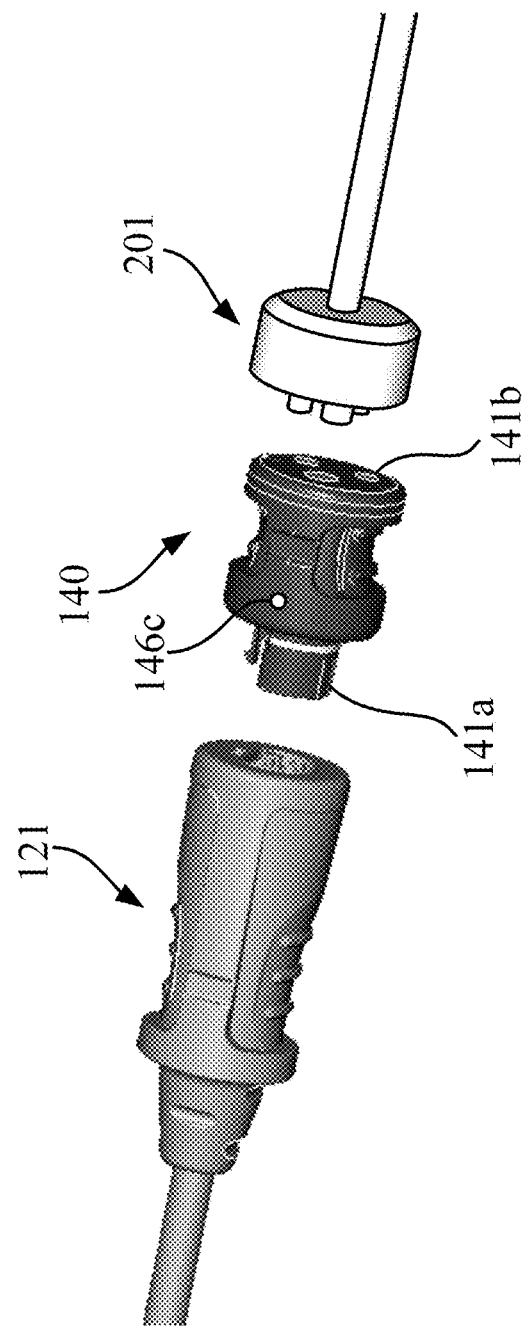
FIG. 2 is an interpretation diagram illustrating the communication apparatus according to an embodiment of the invention.

Reference is also made to FIG. 2, which is an interpretation diagram illustrating the communication apparatus 140. As shown in FIG. 2, the communication apparatus 140 includes a module connector 141a and a load connector 141b. The communication apparatus 140 may connect to a connection wiring of the AC module 120 (e.g., the bus wiring 121 of the AC module 120) via the module connector 141a. The communication apparatus 140 may connect to a connection wiring of the load appliance 200 (e.g., the connector 201 of the load appliance 200) via the load connector 141b. The model/type of the connectors (i.e., the module connector 141a and the load connector 141b) of the communication apparatus 140 can be determined according to the model/type of the connection wiring utilized by the AC module 120 and the load appliance 200, and the model/type of the connectors is not limited to what shows in FIG. 2. As shown in FIG. 2, the communication apparatus 140 can be a portable apparatus coupled between the AC modules 120 and the load appliance 200.

As shown in FIG. 1, the communication apparatus 140 in the embodiment includes a sensor 142, an energy-storage unit 144, a control circuit 146 and a safety switch unit 148. The sensor 142 is used for detecting whether the load connector 141b is connected to a load appliance 200 or not. In this embodiment, the control circuit 146 is electrically connected to the module connector 121a (the module connector 121a can referred in FIG. 2). The control circuit 146 is configured for controlling operations on the AC inverters 124 of the AC modules 120. The control circuit 146 includes a confirmation unit 146a, a judgment unit 146b, a warning unit 146c, a command unit 146d and a waveform generator unit 146e.

Figure 3:
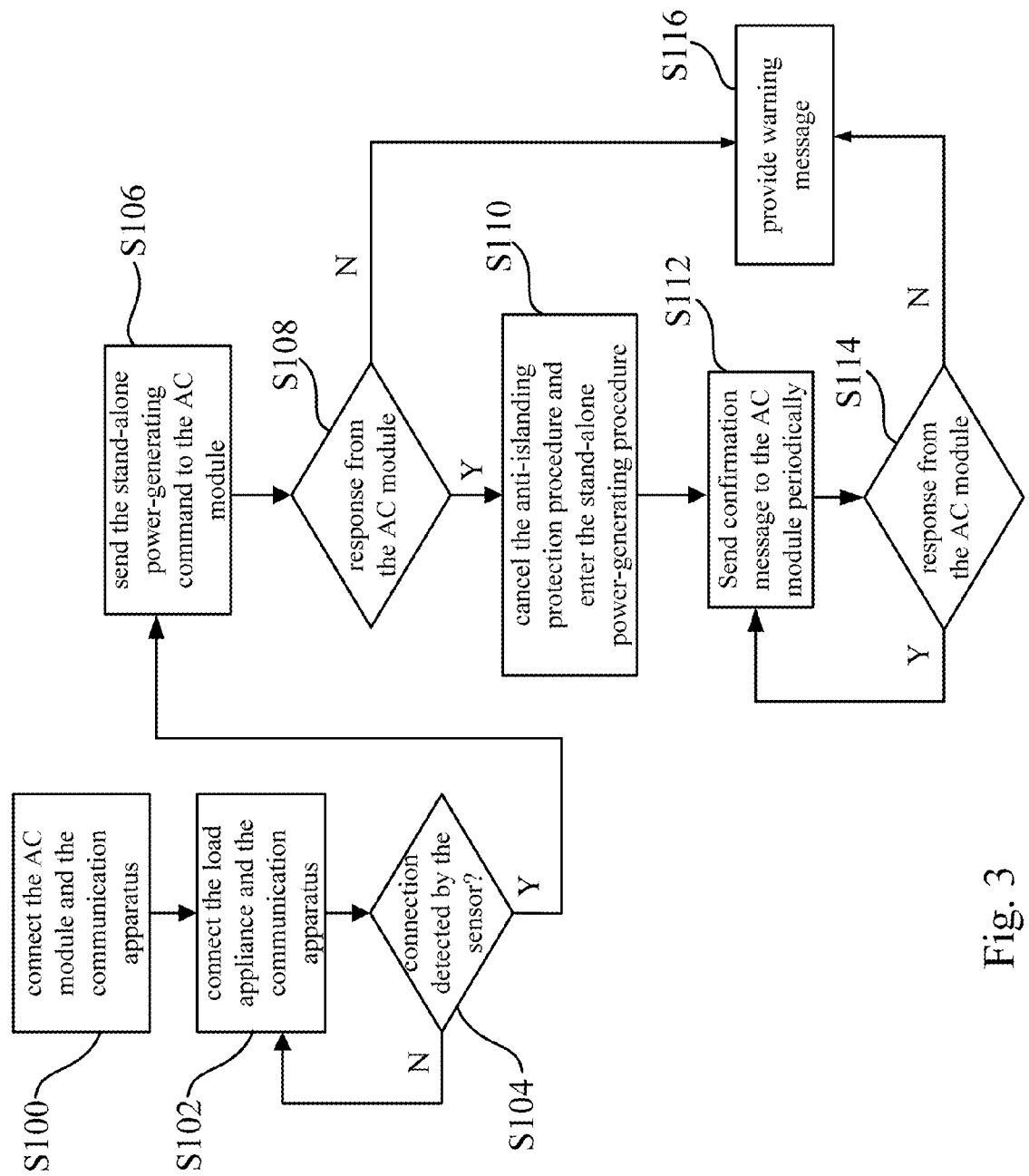
FIG. 3 is a flow diagram illustrating the operations on the communication apparatus according to an embodiment of the invention.

Reference is also made to FIG. 3, which is a flow diagram illustrating the operations on the communication apparatus 140 according to an embodiment of the invention. As the operations of the embodiment shown in FIG. 3, step S100 and step S102 are executed for connecting two ends of the communication device 140 (i.e., the module connector 141a and the load connector 141b) to the AC modules 120 and the load appliance 200. Afterward, step S104 is executed for detecting whether the communication is connected to the load appliance or not by the sensor 142.

When step S104 detects that the connection is formed, the command unit 146d executes step S106 for sending a stand-alone power-generating command to the AC modules 120 via a wired/wireless transmission, and consequently instructing the AC module 120 to start generating electricity, wherein the stand-alone power-generating command is to provide a power from the solar panel to the load appliance.

After step S106 (the stand-alone power-generating command has been sent to the AC modules 120), the judgment unit 146b of the control circuit 146 is configured to execute step S108 for determining whether a response message returned from the AC module 120 is received or not.

If the response message from the AC module 120 is not received, step S116 is executed to provide a warning message by the warning unit 146c, consequently indicate that it is failed to receive the response message from the AC module 120 for the convenience of further inspections. For example, the warning unit 146c can be a light-emitting diode (LED) indicator (e.g., the warning unit 146c shown in FIG. 2). The LED indicator may show a specific color or blink in a specific pattern as the warning message corresponding to the error status (i.e., fail to receive the response message from the AC module 120).

On the other hand, if the response message from the AC module 120 is received, step S110 is executed, in which the AC inverter 124 cancels an anti-islanding protection procedure on the AC inverter 124 according to the stand-alone power-generating command, and enters a stand-alone power-generating procedure.

It should be added that the anti-islanding protection procedure is a common protection procedure used on a distributed power generating system connected with the local public electricity grid. It is assumed that the distributed power generating system (such as each of the AC modules 120 within the solar system 100) is connected to the local public electricity grid in parallel and provides electricity to the local public electricity grid. When a failure occurs to the local public electricity grid and the distributed power generation system does not detach from the local public electricity grid immediately, the sub-systems (the distributed power generation systems) under the local public electricity grid will generate power continuously, and it is referred as the islanding phenomenon. All of the distributed power generation systems (such as wind power systems, solar power systems, household power generators or household power-storage devices parallel-connected to the main electricity grid) may encounter the islanding phenomenon.

The islanding phenomenon may cause some problems. For example, after the failure of the local public electricity grid, maintenance engineers for local public electricity grid must perform the restoration process when the local public electricity grid is totally shut down. However, the distributed power generation system affected by the islanding phenomenon still operates and supplies power at the time and it will threaten the safety of the maintenance engineers. On the other hand, a surge current will be formed at the second of the local public electricity grid is restored, and the surge current over the local public electricity grid may damage the distributed power generation systems parallel-connected to the local public electricity grid. As the distributed power generation systems parallel-connected to the local public electricity grid increase, the occurrence probability of the islanding phenomenon increases correspondingly. In general, an anti-islanding procedure is implemented into each distributed power generation system parallel-connected to the local public electricity grid (such as each of the AC modules 120 within the solar system 100), in order to avoid the occurrence of the islanding phenomenon. In this disclosure, each of the AC modules 120 within the solar system 100 can support an On-grid operation (connected to the local public electricity grid) as well as an Off-grid operation (disconnect from the local public electricity grid). Therefore, in aforesaid step S110, the AC inverter 124 cancels the anti-islanding procedure on the AC inverter 124 according to the stand-alone power-generating command, and consequently performs the stand-alone power generation.

Afterward, during the stand-alone power-generating procedure, step S112 is executed, in which the confirmation unit 146a of the communication apparatus 140 sends a confirmation message to the AC module 120 periodically. The judgment unit 146b determines whether the AC module 120 responses to the confirmation message. If the AC module 120 fails to response to the confirmation message, step S116 is executed for shutting down the power generation and providing the warning message by the warning unit 146c. For example, the LED indicator may show a specific color or blink in a specific pattern as the warning message corresponding to the error status (i.e., fail to receive the response to the confirmation message).

In step S104 of aforesaid embodiment, the sensor 142 is configured for detecting whether the load connector 141b is connected to the load appliance 200. In another embodiment, besides detecting the connection, the sensor 142 further detect whether the connector 201 (referring to FIG. 1 and FIG. 2) connected to the load connector 141b is electrified or not. If the connector 201 is electrified, step S106 of sending the stand-alone power-generating command could be cancelled. When the connector 201 inserted into the load connector 141b is electrified, it represents that the load connector 141b is not connected to an electronic load (can be connected to the local public electricity grid or another power source instead), and in this case the stand-alone power-generating command shall be cancelled.

Figure 4:
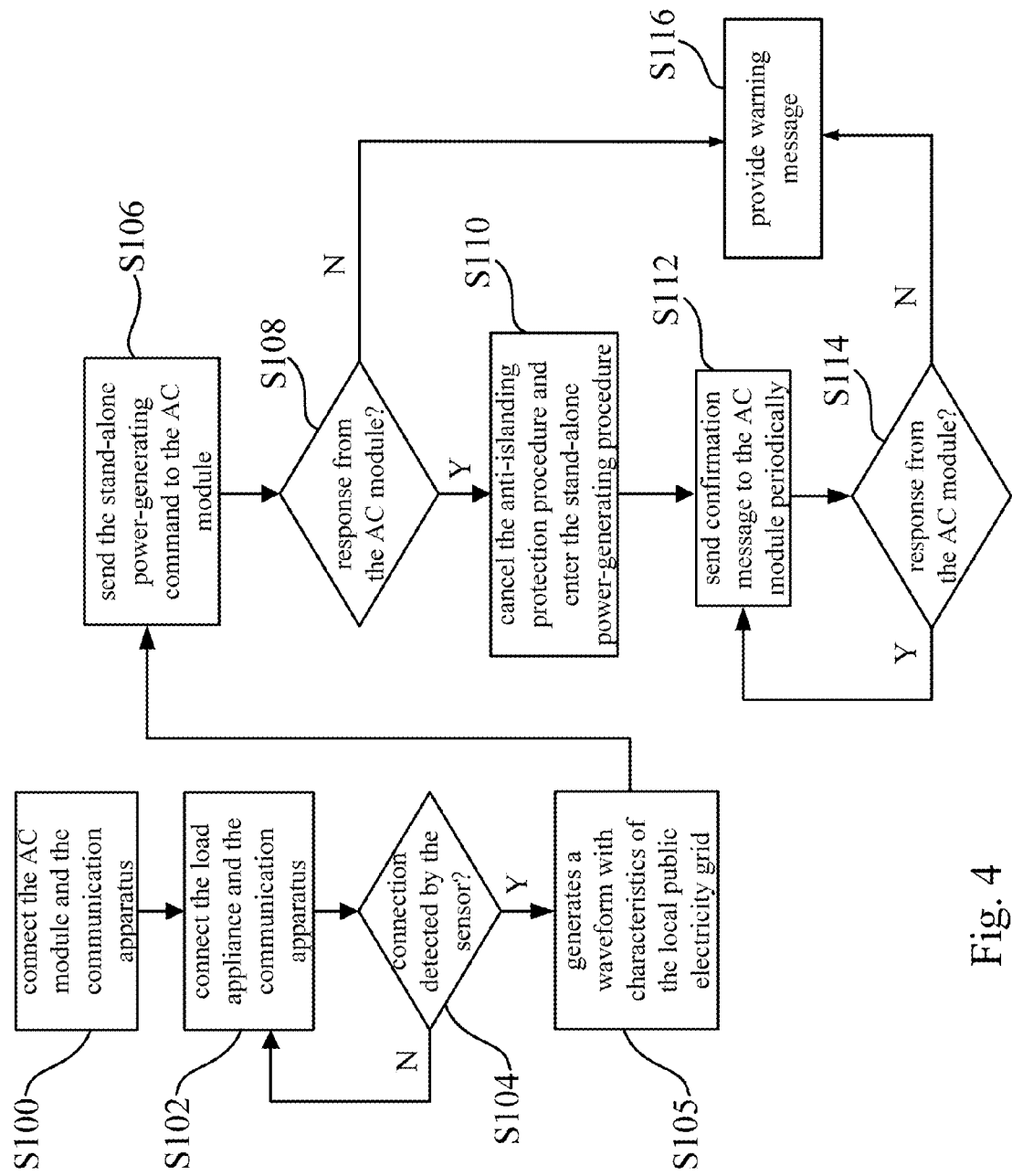
FIG. 4 is another flow diagram illustrating operations on the communication apparatus according to another embodiment of the invention.

In addition, part of the AC modules 120 (especially a small solar AC module or a portable solar AC module) must be operated under On-grid mode in order to function properly. Reference is also made to FIG. 4, which is another flow diagram illustrating operations on the communication apparatus 140 according to another embodiment of the invention. As shown in FIG. 4, between step S104 and step S106 (i.e. before step S106 is executed), the communication device 140 may further perform step S105, in which the communication device 140 generates a waveform with characteristics of the local public electricity grid and transmits the waveform to the AC modules 120. Corresponding to step S105, the communication device 140 includes the energy-storage unit 144 to store electricity. In step S105, when the communication device 140 is connected to the load appliance 200 and before the command unit 146d sends the stand-alone power-generating command to the AC modules 120 (i.e., between steps S104 and S106), the waveform generator unit 146e of the control circuit 146 utilizes the electricity stored in the energy-storage unit 144 to generate the waveform with characteristics of the local public electricity grid, and transmits the waveform to the AC modules 120, consequently simulate the working environment under local public electricity grid for the AC modules 120. In this way, even the AC module 120 which only supports operating under the On-grid mode can receive the waveform with characteristics of the local public electricity grid, and then enter the standby state for a power-generating command to come in the simulated working environment (as working under the local public electricity grid), consequently continue follow-up steps.

On the other hand, as the embodiment shown in FIG. 1, each AC module 120 of the solar power system 100 may include a control circuit 126. The control circuit 126 includes a confirmation unit 126a, a judgment unit 126b and a warning unit 126c.

Figure 5:
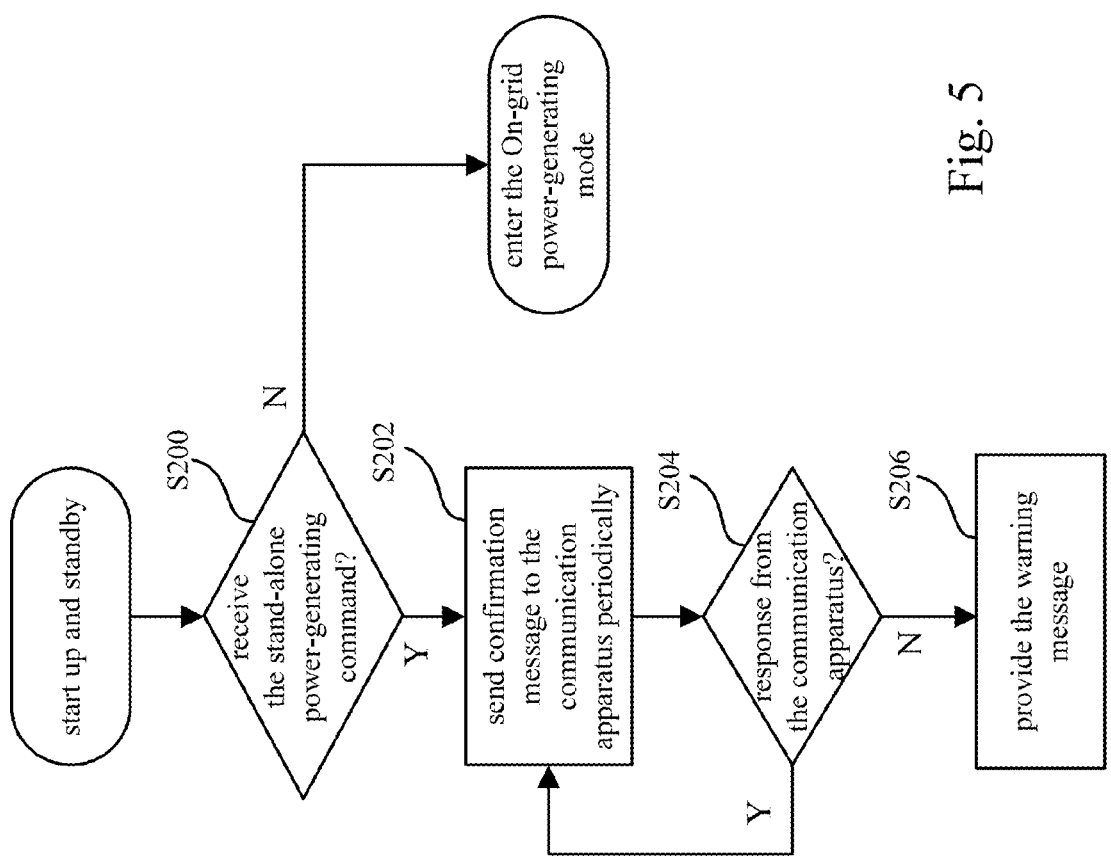
FIG. 5 is a flow diagram illustrating operations on the AC modules according to an embodiment of the invention.

The reference is made to FIG. 5, which is a flow diagram illustrating operations on the AC modules according to an embodiment of the invention. As shown in FIG. 5, after the AC module is powered up and enters the standby state, step S200 is executed, in which the AC module 120 determines whether it receives the stand-alone power-generating command or not. If the AC module 120 does not receive the stand-alone power-generating command, the AC module 120 enters the On-grid mode, which is a default power-generating mode of the traditional solar AC module.

If the AC module 120 receives the stand-alone power-generating command (i.e., during the stand-alone power-generating procedure), step S202 is executed, in which the confirmation unit 126a of the AC module 120 sends a confirmation message periodically to the communication apparatus 140. Afterward, step S204 is executed, in which the judgment unit 126b is configured for determining whether the communication apparatus 140 responses to the confirmation message or not.

When the communication apparatus fails to response to the confirmation message, step S206 is executed, in which the warning unit 126c provides a warning message, and at the same time the alternating-current inverter 124 stops generating power and enters standby mode. For example, the warning unit 126c may include a LED indicator, which shows a specific color or blinks in a specific pattern as the warning message corresponding to the error status.

In addition, the AC modules 120 of the solar power system 100 are not limited to three sets as illustrated in FIG. 1. For example, the solar power system 100 may contain a plurality of AC modules, which are connected to the communication apparatus via a Bus connection, so that a single communication apparatus may control the plurality of AC modules. In another embodiment, the communication apparatus 140 may further include a power equalization unit (not shown). When the communication apparatus 140 is coupled to at least two AC modules, the power equalizer is utilized for equalizing the power outputs from the plurality of AC modules.

In addition, the communication apparatus 140 in FIG. 1 may further include a safety switch unit 148. The safety switch unit 148 can be coupled on a loop between the AC modules 120 and the load appliance 200. When the output power from the AC modules 120 exceeds the power limitation or the total number of the AC modules 120 within the solar power system 100 exceeds the maximum number of parallel-connected modules, the safety switch unit 148 switches off the loop between the AC modules 120 and the load appliance 200. The safety switch unit 148 can be a melting fuse or a non-melting fuse.

Based on aforesaid descriptions, the invention provides a solar power to system and a communication apparatus thereof. The communication apparatus can be used to control each alternating-current (AC) module in the solar power system, such that the AC module may provide a backup power to all kinds of electronic loads (e.g., mobile phones or other mobile devices) under an Off-grid mode. When the mobility is not required, the AC module can be parallel-connected to the local public electricity grid, such that the AC module may generate electricity like a fixed solar power system. On the other hand, when the mobility is required (e.g., travelling or hanging out for a long time), the AC module with a compact size can be utilized as a mobile power generator, which can be carried by users or mounted on vehicles. The AC module can be used to replace traditional movable power sources, such as batteries or diesel generators As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation consequently encompass all such modifications and similar structures.

What is claimed is:

1. A solar power system, comprising:
   at least one alternating-current module comprising a solar panel and an alternating-current inverter electrically connected with the solar panel; and
   a communication apparatus, connected to the at least one alternating-current module, for controlling stand-alone power-generating operations on the at least one alternating-current module, wherein the communication apparatus comprises:
   a load connector;
   a sensor configured for detecting whether the load connector is connected to a load appliance or not; and
   a command unit configured for sending a stand-alone power-generating command to the alternating-current module when the load connector is connected to the load appliance.

2. The solar power system as claimed in claim 1, wherein the stand-alone power-generating command is to provide a power from the solar panel to the load appliance.

3. The solar power system as claimed in claim 1, wherein the communication apparatus comprises:
   a judgment unit configured for determining whether a response message responded from the alternating-current module is received or not after the stand-alone power-generating command has been sent to the alternating-current module; and
   a warning unit configured for providing a warning message when the response message is not received.

4. The solar power system as claimed in claim 3, wherein, when the alternating module receives the stand-alone power-generating command, the alternating-current inverter enter an stand-alone power-generating procedure according to the stand-alone power-generating command.

5. The solar power system as claimed in claim 4, wherein the communication apparatus comprises:
   a confirmation unit configured for sending a confirmation message periodically to the alternating-current module during the stand-alone power-generating procedure, the judgment unit judges whether the alternating-current module responses to the confirmation message or not, and the warning unit provides a warning message when the alternating-current module fails to response to the confirmation message.

6. The solar power system as claimed in claim 4, wherein the alternating-current module comprises:
   a confirmation unit configured for sending a confirmation message periodically to the communication apparatus during the stand-alone power-generating procedure;
   a judgment unit configured for determining whether the communication apparatus responses to the confirmation message or not; and
   a warning unit configured for providing a warning message when the communication apparatus fails to response to the confirmation message, and at the same time the alternating-current inverter shuts down.

7. The solar power system as claimed in claim 2, wherein the communication apparatus comprises:
   a judgment unit configured for determining whether a response message responded from the alternating-current module is received or not after the stand-alone power-generating command has been sent to the alternating-current module; and
   a warning unit configured for providing a warning message when the response message is not received.

8. The solar power system as claimed in claim 7, wherein, when the alternating module receives the stand-alone power-generating command, the alternating-current inverter enter an stand-alone power-generating procedure according to the stand-alone power-generating command.

9. The solar power system as claimed in claim 8, wherein the communication apparatus comprises:
   a confirmation unit configured for sending a confirmation message periodically to the alternating-current module during the stand-alone power-generating procedure, the judgment unit judges whether the alternating-current module responses to the confirmation message or not, and the warning unit provides a warning message when the alternating-current module fails to response to the confirmation message.

10. The solar power system as claimed in claim 7, wherein the alternating-current module comprises:
    a confirmation unit configured for sending a confirmation message periodically to the communication apparatus during the stand-alone power-generating procedure;
    a judgment unit configured for determining whether the communication apparatus responses to the confirmation message or not; and
    a warning unit configured for providing a warning message when the communication apparatus fails to response to the confirmation message, and at the same time the alternating-current inverter shuts down.

11. A communication apparatus, comprising:
    a module connector configured for connecting to an alternating-current module, the alternating-current module comprising a solar panel and an alternating-current inverter electrically connected to the solar panel; and
    a control circuit electrically connected to the module connector for controlling operations on the alternating-current inverter
    a load connector; and
    a sensor configured for detecting whether the load connector is connected to a load appliance or not,
    wherein the control circuit comprises a command unit configured for sending a stand-alone power-generating command to the alternating-current module when the load connector is connected to the load appliance.

12. The communication apparatus as claimed in claim 11, wherein the control circuit comprises:
    a judgment unit configured for determining whether a response message responded from the alternating-current module is received or not after the stand-alone power-generating command has been sent to the alternating-current module; and
    a warning unit configured for providing a warning message when the response message is not received.

13. The communication apparatus as claimed in claim 12, wherein, when the alternating-current module receives the stand-alone power-generating command, the alternating-current inverter enter a stand-alone power-generating procedure according to the stand-alone power-generating command,
    the control circuit comprises a confirmation unit configured for sending a confirmation message periodically to the alternating-current module during the stand-alone power-generating procedure, the judgment unit judges whether the alternating-current module responses to the confirmation message or not, and the warning unit provides a warning message when the alternating-current module fails to response to the confirmation message.

* * * * *